(12) United States Patent
Holler et al.

(10) Patent No.: US 8,388,229 B2
(45) Date of Patent: Mar. 5, 2013

(54) BEARING ARRANGEMENT FOR A TINE CARRIER ON A REEL OF A HARVESTER

(75) Inventors: Frank Holler, Stein Wingert (DE); Sascha Otto, Racksen (DE)

(73) Assignee: Gebr. Schumacher Gerätebaugesellschaft mbH, Eichelhardt (DE)

( * ) Notice: Subject to any disclaimer, the term of this patent is extended or adjusted under 35 U.S.C. 154(b) by 726 days.

(21) Appl. No.: 12/582,935

(22) Filed: Oct. 21, 2009

(65) Prior Publication Data

US 2010/0098361 A1 Apr. 22, 2010

(30) Foreign Application Priority Data

Oct. 21, 2008 (DE) .................. 10 2008 052 581

(51) Int. Cl.
*F16C 13/00* (2006.01)
(52) U.S. Cl. .................................................. 384/460
(58) Field of Classification Search .............. 384/157, 384/460; 11/140, 163–169, 192, 193
See application file for complete search history.

(56) References Cited

U.S. PATENT DOCUMENTS

| 2,247,685 | A | * | 7/1941 | Hipple | 384/157 |
| 2,294,234 | A | * | 8/1942 | Johnston et al. | 384/157 |
| 2,647,805 | A | * | 8/1953 | Kraus | 384/157 |
| 2,732,266 | A | * | 1/1956 | Robertson | 384/157 |
| 4,938,425 | A | | 7/1990 | Williams et al. | |
| 6,698,175 | B1 | | 3/2004 | Schumacher et al. | |
| 2001/0037638 | A1 | | 11/2001 | Krone et al. | |
| 2006/0037830 | A1 | | 2/2006 | Sowul et al. | |

FOREIGN PATENT DOCUMENTS

| DE | 60171 | 5/1969 |
| DE | 100 29 372 | 10/2001 |
| DE | 10 2005 035 156 | 3/2006 |
| EP | 0 300 299 | 7/1988 |
| EP | 1 151 658 | 11/2001 |
| EP | 1 716 740 | 11/2006 |
| GB | 2 040 660 | 9/1980 |

* cited by examiner

*Primary Examiner* — Phillip A Johnson
(74) *Attorney, Agent, or Firm* — Harness, Dickey & Pierce, P.L.C.

(57) ABSTRACT

A bearing arrangement (9) for a tine carrier (5) on a reel (1) of a harvester has first and second bearing elements and an attachment mechanism. The first bearing element is in the form of a bearing bushing (10) with a bearing bore (16) to rotatably support a tine carrier (5) around a rotational axis D. The attachment mechanism (17) attaches the bearing bushing (10) onto a support element (7) of the reel (1). The second bearing element is in the form of a bearing ring (25). The bearing ring (25) is fixable onto the tine carrier (5). The bearing ring (25) has a first ring portion (26) and a second ring portion (27). The ring portions (26, 27) are detachably connected to each other. The two bearing elements (10, 25) are rotatably held and axially supported relative to each other.

16 Claims, 4 Drawing Sheets

BEARING ARRANGEMENT FOR A TINE CARRIER ON A REEL OF A HARVESTER

CROSS-REFERENCE TO RELATED APPLICATION

This application claims priority to German Patent Application No. 102008052581.2 filed Oct. 21, 2008, which application is herein expressly incorporated by reference.

FIELD

The disclosure relates to a bearing arrangement for a tine carrier on a reel of a harvester. The bearing element is in the form of a bearing bushing with a bearing bore to rotatably support the tine carrier around a rotational axis. An attachment mechanism attaches the bearing bushing onto a support element of the reel.

BACKGROUND

In practice, two basic groups of reels are used on a cutting device for a harvester. One type is a simple paddle reel that only guides the harvested goods to the machine with tine-less paddle bars, in general a cutting device. A second type has tine reels with paddle tubes or paddle bars and additional steel or plastic tines mounted to the reels.

The tine reel has established itself in combine harvesters, compared to the simple paddle reel. Tine reels can securely process laid grain or vortexed harvested goods. In a simple reel, the paddle bars are rigidly mounted on radial support stars. The stars are attached to a center axis that is rotatably supported on side beams above the cutting bar or picking-up bar of a harvester, in a known manner. In contrast, the bars or tubes equipped with tines, as a tine carrier, have to be rotatably supported on the radial support stars. Thus, it is desirable to achieve a state where the tines always operate approximately vertical to the ground. In most cases, for this, a control star is used. This control star is arranged radially eccentrically to the axis. It is also eccentrically to the support stars. The control star is provided in its center with a circular control path where one or several guide rollers can roll. The guide rollers are supported with a corresponding connection mechanism on the side beams. The tine carriers are provided at the ends with small crank levers. The crank lever's crank lugs are respectively rotatably supported on the control star. The control star rotates, in this case, in the same direction and with the same number of revolutions as the retaining star. As the control star rotates eccentrically relative to the retaining stars, the crank ends of the tine carrier bars or the tine carrier tubes are rotated once with each reel revolution. Thus, the tines are always directed in the same direction. In most cases, the tines are directed straight downwards. Such reel controls are known for example from DE 100 29 372 C2.

The tine carriers are, in this case, rotatably supported on the support elements via bearing arrangements. Since harvesters are also used on hilly ground, the tine carriers have to be supported, when they are located on a side slope, axially in direction of the rotational axes on the support elements.

To accomplish this, rings are pushed onto the tine carrier. Two rings are fixed at both sides of a bearing arrangement to support a tine carrier. Thus, the tine carrier can be supported, via the rings, axially on the bearing arrangement. From DD 60 171, a bearing arrangement is shown where the tine carrier is rotatably arranged between a bearing half and bearing bracket. The bearing half is connected to a reel arm. The bearing bracket is also connected to the reel arm. The bearing half has a groove that extends partially around the rotational axis of the tine carrier. The bearing bracket has an opening, in the form of a slot, that also extends partially around the rotational axis. A ring is press-fit or shrink-fit onto the tine carrier so that it is fixed onto the tine carrier. The ring engages the groove of the bearing half and the opening of the bearing bracket. The ring is rotatably and axially supported on the tine carrier.

A disadvantage of the bearing arrangements is that the rings have to be pushed onto the tine carrier to areas of the bearing arrangements before the assembly of the tines. This leads to a time consuming assembly and makes the exchange of the rings, due to wear, very cumbersome.

SUMMARY

Thus, it is an object of the present disclosure to provide a bearing arrangement of the above type that is constructed in a simple manner. Also, the bearing arrangement can be simply mounted.

The object is solved by a bearing arrangement for a tine carrier on a reel of a harvester that comprises a first and second bearing element and an attachment element. The first bearing element is in the form of a bearing bushing with a bearing bore to rotatably support a tine carrier around a rotational axis. The attachment mechanism attaches the bearing bushing onto a support element of a reel. The second bearing element, in the form of a bearing ring, is fixable onto the tine carrier. The bearing ring is split and has a first ring portion and a second ring portion. The first and second ring portions are detachably connected to each other. The two bearing elements are rotatably held relative to each other and are axially supported on each other.

Thus, the tine carrier can be pre-assembled with the tines before it is mounted onto the reel. The bearing ring can be mounted onto the tine carrier at a later time due to the fact that it is separated into two pieces. For this, the two ring portions are slipped onto the tine carrier in a radial direction and connected to each other.

One of the bearing elements has a circumferentially extending groove. The other bearing element has a circumferentially extending collar. The collar can be rotatably accommodated and axially supported in the groove.

The bearing bushing has a sleeve portion that includes the collar. The collar projects radially outward from the sleeve portion. The bearing ring has the groove in the form of an inner circumferential groove. Thus, the bearing bushing can be initially attached onto the support element. Later, the bearing ring, with the two bearing portions, can be mounted onto the tine carrier. The ring portions are mounted from the outside with the groove on the sleeve portion of the bearing bushing.

For a simple assembly, the ring portions are screwed onto each other. Thus, the ring portions are clamped onto and fixed on the tine carrier.

The bearing bushing is split into a first bushing segment and a second bushing segment. The bushing segments extend, respectively, over a portion of the circumference of the bearing bore. Thus, the bearing bushing can also be mounted, after the assembly of the tine, onto the tine carrier and if necessary, it can also be disassembled in maintenance cases.

The bushing segments can extend relative to the rotational axis about different angles. The bushing segments are detachably connected to each other.

The bearing bushing has a flange that attaches the bearing bushing onto the support element of the reel. In this case, the flange can have bores, to screw the bearing bushing to the support element.

Further areas of applicability will become apparent from the description provided herein. The description and specific examples in this summary are intended for purposes of illustration only and are not intended to limit the scope of the present disclosure.

DRAWINGS

In the following, a preferred embodiment of the bearing arrangement is described in detail using the drawings.

DETAILED DESCRIPTION

A preferred embodiment of the present disclosure will be described with reference to the accompanying drawings.

Figure 1:
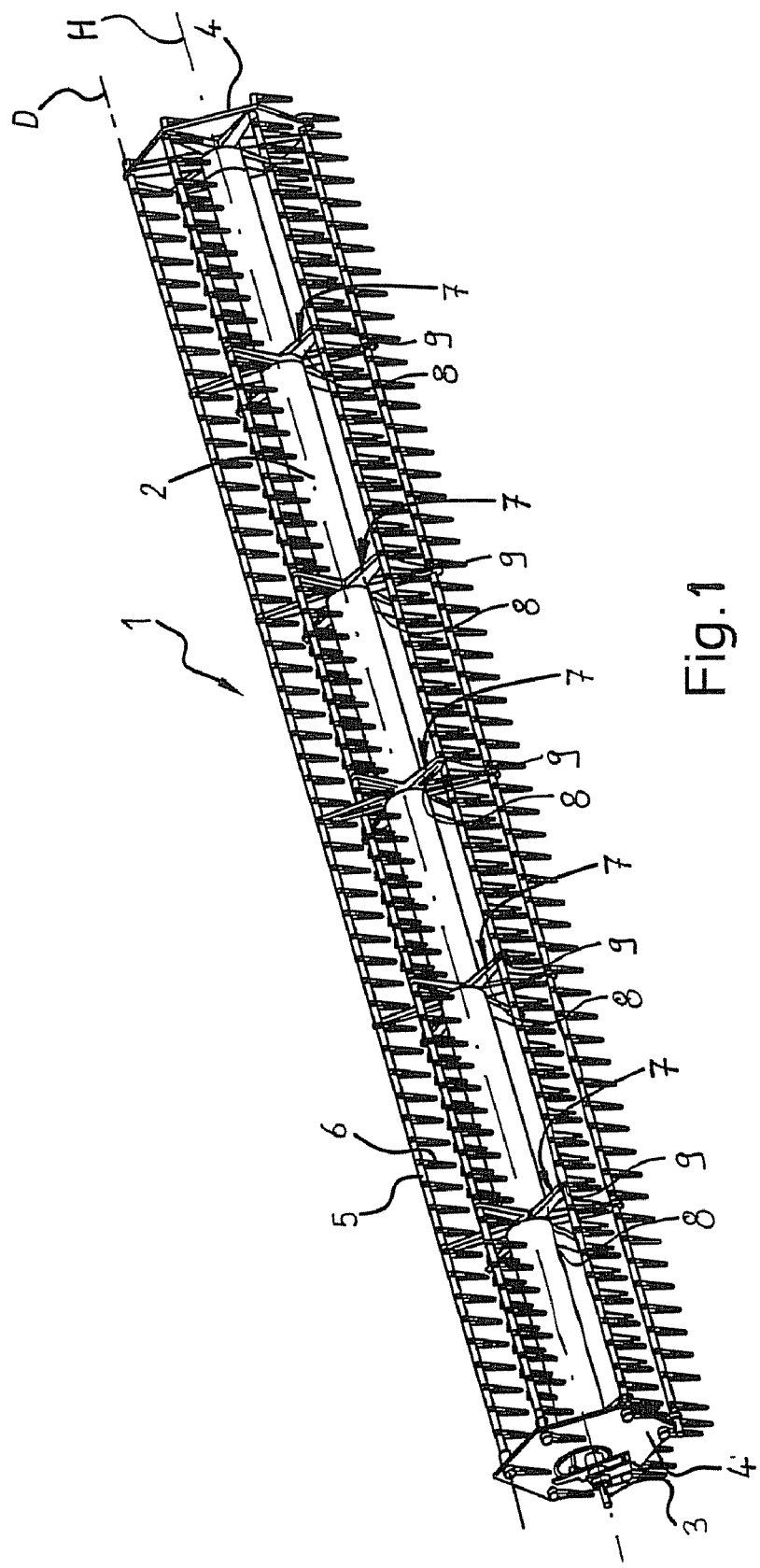
FIG. 1 is a perspective representation of a reel.

In FIG. 1, a reel 1 has a central tube 2 with pivot pins 3 at its ends. The central tube 2 is driven and rotationally supported by the pivot pins in a not shown receptacle of a cutting section of a harvester around a reel axis H. Setting arrangements 4 are provided at the ends of the central tube 2. The tine carriers 5 are rotationally driven, respectively, around a rotational axis D in a known manner. The tine carriers 5 are tube-like and extend parallel to the reel axis H. In the present case, six tine carriers 5 are provided that are arranged in a distributed manner with equal distances around the reel axis H. On the tine carriers 5, respectively, a multitude of tines 6 is mounted. The tines project radially to the respective rotational axis D from the tine carrier 5. All tines 6 of a tine carrier 5 are aligned identically. The setting arrangement 4 drives the tine carrier 5 such that the tines 6 are always directed approximately vertically downwards. Generally, however, other alignments are possible, and also different alignments of the individual tine carriers 5 relative to each other are possible.

Several support elements 7, in the form of retaining stars, are provided to prevent the tine carriers 5 from bending. The support elements 7 are firmly connected to the central tube 2. The support elements 7 have, for each tine carrier 5, a support arm 8. The support arm 8 extends radially to the rotational axis D. At the free ends of the support arms 8, respectively, one bearing arrangement 9 is provided. Thus, the respective tine carrier 5 is rotationally supported on the support arm 8 by the bearing arrangements 9.

Figure 2:
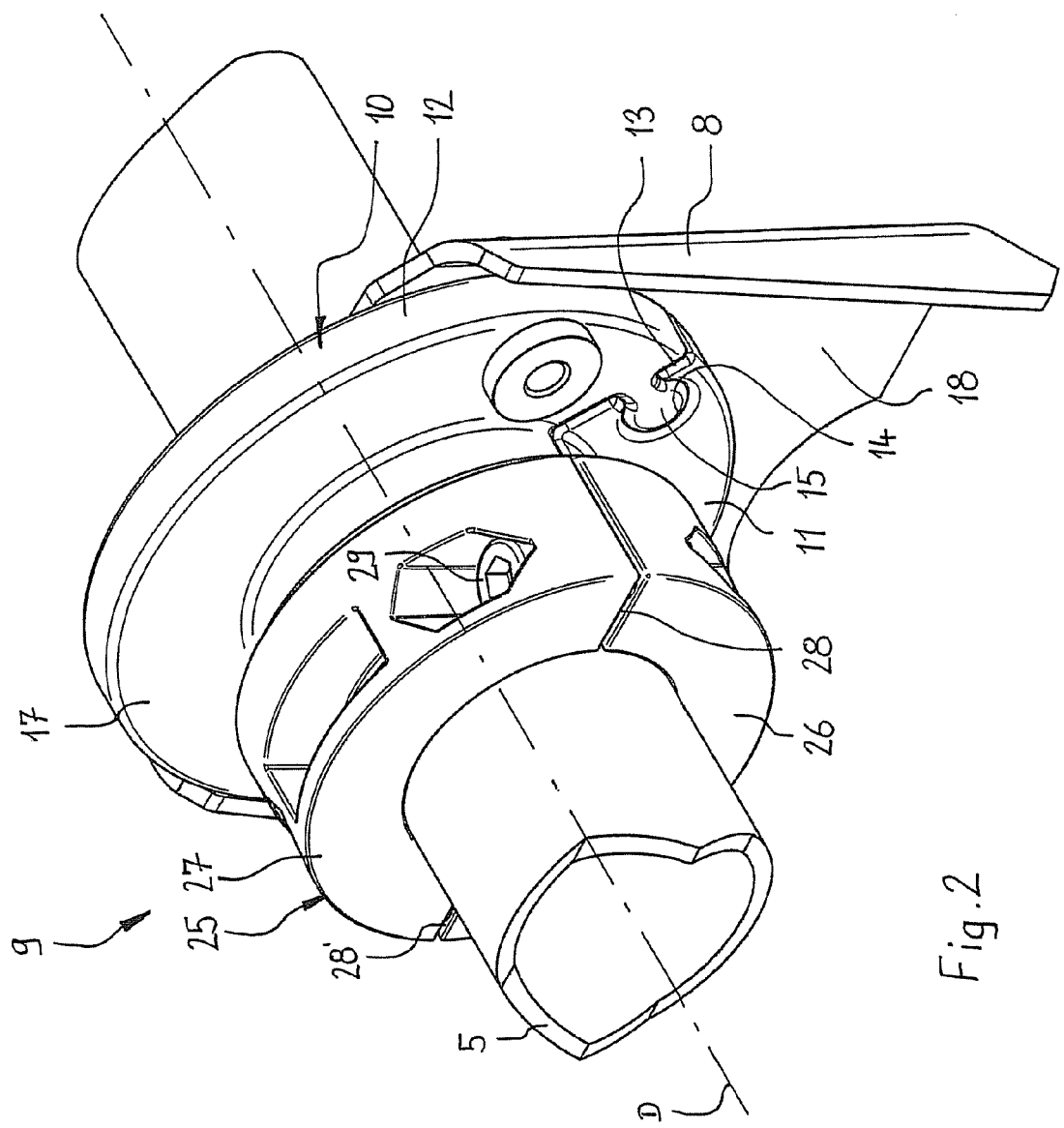
FIG. 2 is a perspective representation view of the bearing arrangement.
Figure 3:
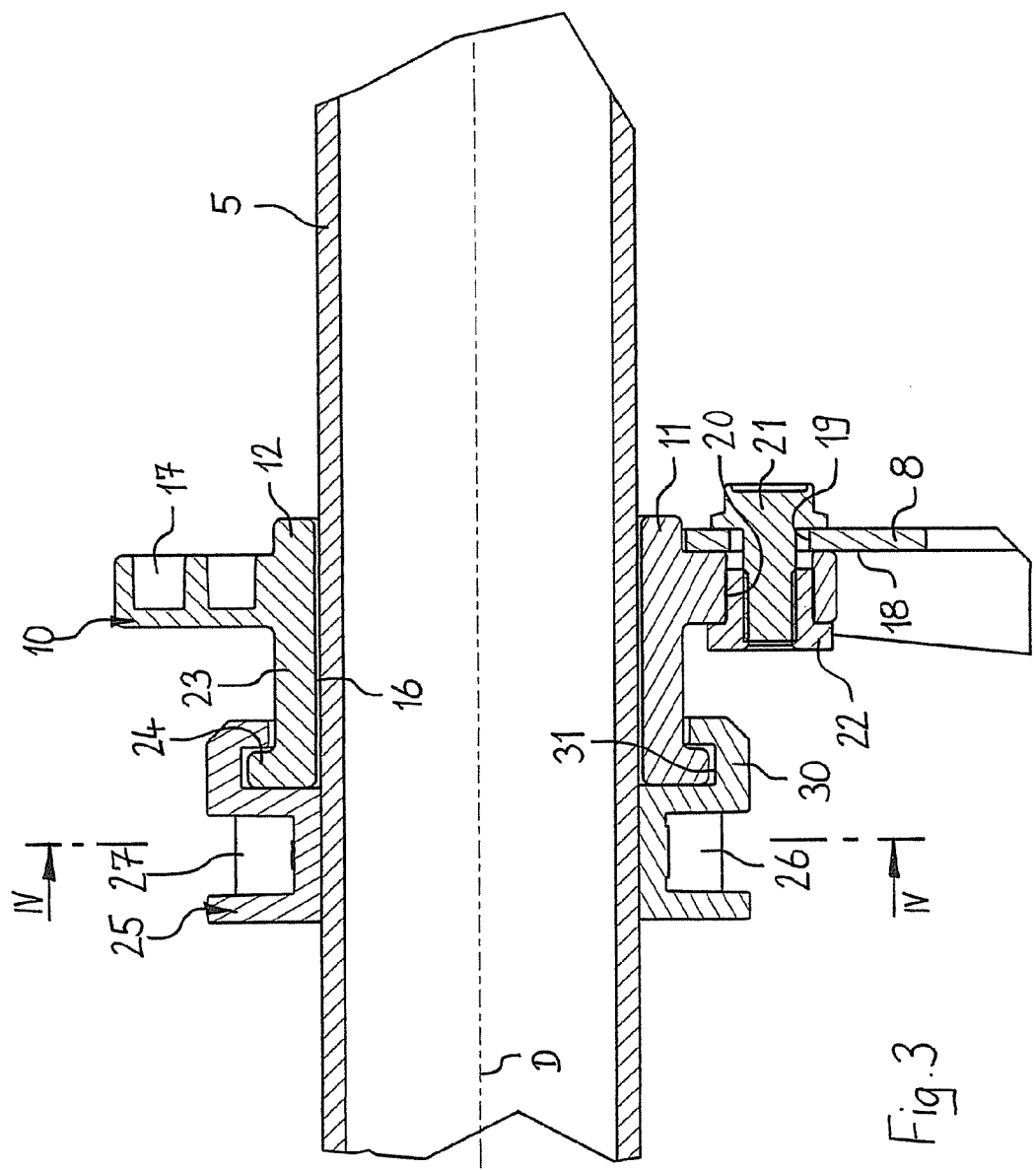
FIG. 3 is a longitudinal sectional view through a bearing arrangement of FIG. 2.
Figure 4:
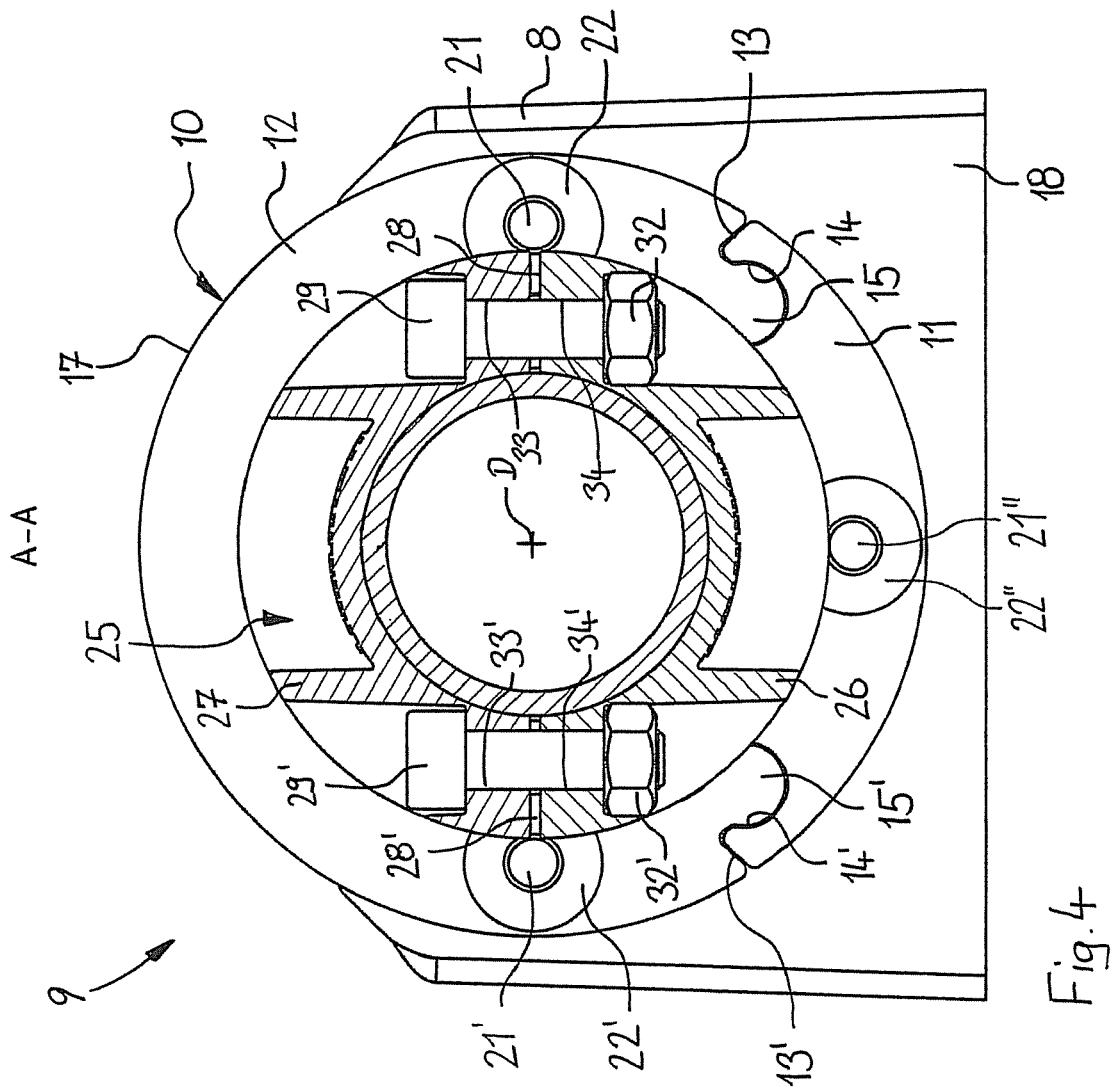
FIG. 4 is a cross-sectional view along the intersecting line IV-IV of FIG. 3.

FIGS. 2 to 4 show a bearing arrangement in different views. The figures are described together in the following.

The bearing arrangement 9 includes a bearing bushing 10. The tine carrier 5, in the present case, is in the form of a tube and is rotationally supported by the bearing bushing 10. The bearing bushing 10 includes a first bushing segment 11 and a second bushing segment 12 that are coupled together to form the bearing bushing 10. The bushing segments 11, 12 extend, respectively, about a portion of the circumference around the rotational axis D. In the assembled condition, the bushing segments 11, 12 form two separating gaps 13, 13'. Each separating gap 13, 13' is arranged approximately on a plane that contains the rotational axis D. The planes are arranged at an angle to each other. However, the two separating gaps 13, 13' may also be arranged on a common plane. In the area of the separating gaps 13, 13', the first bushing segment 11 has, respectively, an undercut attachment recess 14, 14'. A correspondingly formed undercut attachment projection 15, 15' of the second bushing segment 12 engages the undercut attachment recess 14, 14'. Thus, the two bushing segments 11, 12 can be connected to each other and pre-assembled. Additionally, however, other attachment mechanisms, as for example a screw connection, may be considered to fix the two bushing segments to each other.

The bearing bushing 12 forms a bearing bore 16 that is centered on the rotational axis D. The bearing bore 16 is formed as a through bore. The bearing bore 16 accommodates the tine carrier 5, in the form of a tube, and serves as a radial bearing.

The bearing bushing 10 has a flange 17. The flange 17 is circumferentially arranged and extends and projects outward in a radial direction. The flange 17 connects the bearing bushing 10 to the support arm 8. The support arm 8 is formed as a transformed piece of a sheet and has a side face 18. The flange 17 abuts the side face 18. Attachment bores 19 are provided on the support arm 8. The attachment bores 19 are aligned with the attachment bores 20 in the flange 17 of the bearing bushing 10. Attachment screws 21 pass through the attachment bores 19, 20 and are secured by attachment nuts 22 to detachably attach the bearing bushing 10 on the support arm 8.

The bearing bushing 10 includes a sleeve portion 23 that forms, at an axial end, a circumferentially extending collar 24. The collar 24 projects radially outward.

A bearing ring 25 is fixed on the tine carrier 5. The bearing ring 25 is separated into two pieces. It has a first ring portion 26 and a second ring portion 27. In the assembled condition, the two ring portions 26, 27 form separating gaps 28, 28'. In the present case, the separating gaps 28, 28' are arranged diametrically opposite to each other. They are arranged, respectively, on a plane, that contains the rotational axis D. Via attachment screws 29, 29' and attachment nuts 32, 32', the two ring portions 26, 27 are screwed to each other and are clamped onto the tine carrier 5. The attachment screws 29 are, respectively, passed through bores 33, 33'; 34, 34' of the ring portions 26, 27 that extend through the separating gaps 28, 28'.

The bearing ring 25 is laterally arranged relative to the bearing bushing 10. The bearing ring 25 has a sleeve extension 30 that faces the bearing bushing 10. The sleeve extension 30 forms a groove in form of an inner circumferential groove 31. The inner circumferential groove 31 accommodates the collar 24 of the sleeve portion 23 of the bearing bushing 10. In this case, the collar 24 is supported on the sleeve extension 30 in both directions so that it can rotate in the inner circumferential groove 31. A clearance is provided between the collar 24 and the sleeve extension 30 defining the inner circumferential groove 31.

The bearing ring 25 is separated into two pieces by the two ring portions 26, 27. The ring portions 26, 27 can be attached to the tine carrier 5 from diametrically opposite sides of the tine carrier 5 and secured to each other. In the present case, the bearing ring 25 can also be directly clamped onto the tine carrier 5 due to the connection of the two ring portions 26, 27. Additionally, other attachment mechanisms for fixing the bearing ring 25 on the tine carrier 5 may be used. For example, separate screw connections may be utilized. Thus, the bearing ring 15 can be mounted onto the tine carrier 5 without the need to be laterally slipped onto the tine carrier 5. Thus, especially in maintenance cases, the disassembly of the tines is not necessary. The same is true for the bearing bushing 10.

In the present case, since the bushing 10 is separated into two pieces, the individual bushing segments 11, 12 can be mounted in a radial direction relative to the rotational axis D onto the tine carrier 5. In the present case, the bushing segments 11, 12 can be attached, initially axially off-set to each other, on the tine carrier and then slipped in an axial direction towards each other. Thus, the attachment projection 15 is inserted into the attachment recess 14.

Generally, the two-piece recess form of the bearing ring 25 and the bearing bushing 10 also provide solutions where the ring portions 26, 27 or the bushing segments 11, 12 can be connected to each other in an articulated manner at one point. Thus, the parts can be pivoted away from each other.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A bearing arrangement for a tine carrier on a reel of a harvester, comprising:
    a first bearing element in the form of a bearing bushing with a bearing bore to rotatably support the tine carrier around a rotational axis,
    an attachment mechanism for attaching the bearing bushing on a support element of the reel;
    a second bearing element in the form of a bearing ring, said bearing ring is fixable on the tine carrier, said bearing ring has a first ring portion and a second ring portion, the first ring portion and the second ring portion are detachably connected to each other in a circumferential direction; and
    the first and second bearing elements are rotatably held relative to each other and are axially supported on each other.

2. The bearing arrangement according to claim 1, wherein one of the first and second bearing elements has a circumferentially extending groove and the other of the first and second bearing element has a circumferentially extending collar, said collar can be rotatably accommodated and axially supported in the groove.

3. The bearing arrangement according to claim 2, wherein the bearing bushing has a sleeve portion that includes the collar, the collar projects radially outward, and the bearing ring has a groove in the form of an inner circumferential groove.

4. The bearing arrangement according to claim 1, wherein the first and second ring portions are secured to each other.

5. The bearing arrangement according to claim 1, wherein the bearing ring is clamped onto the tine carrier.

6. The bearing arrangement according to claim 1, wherein the bearing bushing is split into a first bushing segment and a second bushing segment, the bushing segments extend, respectively, over a portion of the circumference of the bearing bore.

7. The bearing arrangement according to claim 6, wherein the bushing segments extend relative to the rotational axis over different angles.

8. The bearing arrangement according to claim 6, wherein the two bushing segments are detachably connected to each other.

9. The bearing arrangement according to claim 1, wherein the bearing bushing has a flange, said flange attaches the bearing bushing onto the support element of the reel.

10. A bearing arrangement for a tine carrier on a reel of a harvester, comprising:
    a first bearing element in the form of a bearing bushing with a bearing bore to rotatably support the tine carrier around a rotational axis;
    an attachment mechanism for attaching the bearing bushing on a support element of the reel;
    a second bearing element in the form of a bearing ring, said bearing ring is fixable on the tine carrier, the bearing ring has a first ring sector portion and a second ring sector portion that are detachably connected to each other in a circumferential direction;
    the two bearing elements are rotatably held relative to each other and are axially supported on each other;
    the bearing bushing has a sleeve portion having a collar projecting radially outwards;
    the bearing ring has an inner circumferential groove; and
    the collar is rotatably accommodated in the groove and axially supported therein.

11. The bearing arrangement according to claim 10, wherein the first and second ring sector portions are secured to each other.

12. The bearing arrangement according to claim 10, wherein the bearing ring is clamped onto the tine carrier.

13. The bearing arrangement according to claim 10, wherein the bearing bushing is split into a first bushing segment and a second bushing segment, the bushing segments extend, respectively, over a portion of the circumference of the bearing bore.

14. The bearing arrangement according to claim 13, wherein the bushing segments extend relative to the rotational axis over different angles.

15. The bearing arrangement according to claim 13, wherein the two bushing segments are detachably connected to each other.

16. The bearing arrangement according to claim 10, wherein the bearing bushing has a flange, the flange attaches the bearing bushing onto the support element of the reel.

* * * * *